Patented July 4, 1939

2,164,727

UNITED STATES PATENT OFFICE 2,164,727

PROCESS FOR THE PRODUCTION OF LOW CARBON STEEL

Sigurd Westberg, Oslo, Norway

No Drawing. Application May 10, 1938, Serial No. 207,155. In Norway May 18, 1937

1 Claim. (Cl. 75—28)

In the usual production of steel, for instance by fining of scrap iron, pig iron or the like in basic Martin furnace, it has been considered necessary to avoid an excessive oxygen content in the molten material, and for that reason the fining process has either been interrupted at a sufficiently early moment, or deoxidizing and/or reducing additions have been resorted to. Experience has shown that the steel produced, even if it has the desired degree of purity, is absolutely useless in case the amount of dissolved oxygen (generally in the form of FeO) exceeds a very low limit.

In accordance with the present invention a steel with an exceedingly low amount of carbon is produced by first producing by means of a highly oxidizing fining process, which is at least sufficient to remove manganese, silicon and partly also sulphur and phosphor from the raw material, a comparatively low carbon steel with a comparatively high amount of dissolved oxygen (in the form of FeO) and then exposing this material in granulated condition to a heat treatment at temperatures below the melting point of the material in an atmosphere, the composition of which is determined in accordance with the ratio between the oxygen and carbon present in the material.

During this heat treatment the oxygen dissolved in the material will react with the carbon, which will then diffuse outwards as carbon monoxide, whereupon the oxygen, if any, remaining in the material, is removed by means of hydrogen which diffuses inwards into the granules, replacing the oxygen which is diffusing outwards and is combined with the hydrogen in the surrounding atmosphere.

In cases where the contents of the material of dissolved oxygen in spite of the highly oxidizing fining process is insufficient for removing all dissolved carbon, further amounts of oxygen may be supplied by carrying out the heat treatment in oxygen-containing atmosphere, for instance in a gas mixture comprising oxygen and an inert gas.

After the refining treatment of the oxygen-containing material above specified, the material is melted under conditions, for instance in the presence of reducing or inert gas or the like, under which the degree of purity of the material is best possibly maintained.

As the refining treatment under the present conditions takes place in the course of a very short time, it may be carried out in connection with the melting of the material, which has first been overoxidized in the fining process and then granulated, during the time when the said material is heated in the melting furnace and is still in a solid condition.

It is often preferred to carry out the refining treatment in the presence of such substances as aluminum, calcium, magnesium, silicon and compounds thereof for the purpose of regenerating the hydrogen from the hydrogen compounds formed.

I claim:

A two stage process for the production of low carbon steel, comprising as the first stage the production by highly oxidizing fining and subsequent granulation steel containing little or no manganese and silicon and a comparatively large amount of dissolved oxygen in the form of FeO and as the second stage the heat treatment of said granules at a temperature below melting point in order to cause the dissolved oxygen to react with carbon and diffuse in the form of CO.

SIGURD WESTBERG.